(12) United States Patent
Naim et al.

(10) Patent No.: US 9,985,759 B1
(45) Date of Patent: May 29, 2018

(54) METHOD AND SYSTEM FOR COORDINATED MULTIPOINT TRANSMISSION CONCURRENTLY TO MULTIPLE USER EQUIPMENT DEVICES FROM MULTIPLE BASE STATIONS

(71) Applicant: Sprint Spectrum L.P., Overland Park, KS (US)

(72) Inventors: Muhammad A. Naim, Ashburn, VA (US); Luca Zappaterra, Arlington, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 166 days.

(21) Appl. No.: 15/073,268

(22) Filed: Mar. 17, 2016

(51) Int. Cl.
*H04L 5/00* (2006.01)

(52) U.S. Cl.
CPC .................. *H04L 5/0035* (2013.01)

(58) Field of Classification Search
CPC .................. H04L 5/0035; H04W 72/0426
See application file for complete search history.

(56) References Cited

U.S. PATENT DOCUMENTS

| | | | | |
|---|---|---|---|---|
| 5,539,749 | A * | 7/1996 | Eul | H03M 13/3723 370/331 |
| 8,761,114 | B2 | 6/2014 | Lee et al. | |
| 2007/0165104 | A1* | 7/2007 | Khan | H04B 7/022 348/14.02 |
| 2010/0177746 | A1* | 7/2010 | Gorokhov | H04B 7/024 370/336 |
| 2010/0285792 | A1* | 11/2010 | Chen | H04W 72/005 455/422.1 |
| 2012/0027006 | A1 | 2/2012 | Snow et al. | |
| 2013/0005376 | A1* | 1/2013 | Shirani-Mehr | H04W 72/048 455/509 |
| 2014/0204896 | A1* | 7/2014 | Hui | H04B 7/024 370/329 |

\* cited by examiner

*Primary Examiner* — Tejis Daya

(57) ABSTRACT

A method and system for coordinated multipoint transmission concurrently to multiple user equipment devices (UEs) from multiple base stations. When multiple base stations each serve a respective UE and each base station has a separate bit stream to communicate to its respective served UE, bit groups will be defined across the base station's bit streams, such that each bit group includes at least one bit from each base station's bit stream. And the base stations will then engage in CoMP transmission of each bit group, with all of the base stations transmitting the bit group at the same time and frequency as each other, such as on the same resource element, using the same modulation scheme. Each UE may then receive that transmitted bit group and process just the appropriate bit(s) destined to the UE, discarding the others.

20 Claims, 3 Drawing Sheets

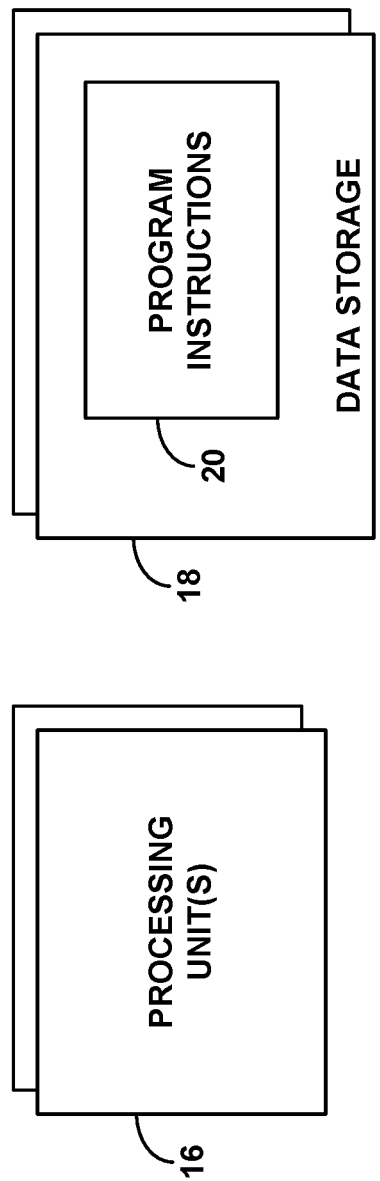

METHOD AND SYSTEM FOR COORDINATED MULTIPOINT TRANSMISSION CONCURRENTLY TO MULTIPLE USER EQUIPMENT DEVICES FROM MULTIPLE BASE STATIONS

BACKGROUND

Unless otherwise indicated herein, the description provided in this section is not itself prior art to the claims and is not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices (whether or not technically operated by a human user), can operate. In turn, each base station may be coupled with network infrastructure, including one or more gateways and switches, that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

In general, a cellular wireless network may operate in accordance with a particular radio access technology or "air interface protocol," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover of UEs between coverage areas, and functions related to air interface communication.

In accordance with the air interface protocol, each coverage area may operate on one or more carrier frequencies for carrying communications between the base station and UEs. Each carrier frequency could be frequency division duplex (FDD), in which the downlink and uplink operate on separate frequency channels, or time division duplex (TDD), in which the downlink and uplink operate on a shared frequency channel and are distinguished from each other over time. Further, each carrier may be structured to define certain air interface resources for carrying communications.

In a representative OFDMA network, for instance, the downlink in each coverage area is mapped over frequency and time into an array of resource elements in which the base station can transmit data to UEs. In particular, the downlink is divided over frequency into a range of closely-spaced orthogonal subcarriers and is divided over time into a continuum of symbol time segments, thereby defining an array of resource elements each centered on a respective subcarrier and spanning a respective symbol time segment. With this arrangement, as the base station has data to transmit to UEs, the base station may transmit the data in particular resource elements to the UE.

By way of example, in accordance with the LTE protocol, the downlink of each carrier could span a frequency bandwidth such as 1.4 MHz, 3 MHz, 5 MHz, 10 MHz, 15 MHz, or 20 MHz, and the frequency bandwidth is divided into 15 kHz subcarriers (subcarriers spaced apart from each other by 15 kHz). Further, the air interface is divided into a continuum of 10-millisecond (ms) frames, and each frame is divided into ten 1 ms sub-frames or transmission time intervals (TTIs), some or all of which may be used for the downlink. Each 1 ms downlink TTI is then further divided into 14 symbol time segments, each spanning 66.7 microseconds plus an added 4.69 microsecond guard band (cyclic prefix). With this arrangement, each TTI thus defines an array of resource elements, each centered on a 15 kHz subcarrier and spanning a symbol time segment, and each such resource element may effectively carry a single orthogonal frequency division multiplexing (OFDM) symbol representing communication data.

In each TTI, certain ones of these resource elements on the downlink are reserved for carrying particular types of communications. For instance, particular resource elements distributed throughout the downlink bandwidth are reserved for carrying a reference signal that UEs can detect and measure as a basis to determine the quality (e.g., strength) of coverage. Further, across the bandwidth, resource elements in the first one, two, or three symbol segments are reserved to define various control channels, such as a physical downlink control channel (PDCCH) in which the base station provides control signals such as resource allocation directives and the like. And the remaining symbol segments in each TTI are then generally reserved to define a physical downlink shared channel (PDSCH) for carrying data to UEs in accordance with the base station's resource allocation directives.

In addition, the resource elements in each TTI are grouped into physical resource blocks (PRBs), each spanning 12 resource elements (180 kHz) in the frequency domain and 7 resource elements in the time domain, thus defining an array of 84 resource elements—although some may be reserved for special use as noted above. Thus, depending on the downlink bandwidth, the air interface may support transmission on a number of such downlink resource blocks in each TTI. For instance, a 5 MHz carrier may support 25 resource blocks in each TTI, whereas a 15 MHz carrier may support 75 resource blocks in each TTI.

When a UE powers on or otherwise enters into coverage of a base station, the UE and base station may engage in signaling with each other to establish an agreed air interface connection, such as a Radio Resource Control (RRC) connection, through which the base station will then serve the UE. Further, the UE may engage in an attachment or registration process via the base station with the network, which may involve the network authenticating and authorizing the UE and establishing one or more network connections for carrying communications between the UE and one or more transport networks. Having an established air interface connection with the base station, the UE may then be considered to be operating in a connected mode.

With the UE operating in the connected mode, as the base station receives data for transmission to the UE, the base station may select particular air interface resources to carry the data, and the base station may transmit to the UE a resource allocation directive specifying the selected resources and transmit the data to the UE in the selected/specified resources. In LTE, for instance, the base station may select particular PRBs to carry the data in a given TTI, the base station may transmit to the UE in the PDCCH of that TTI a downlink control information (DCI) message that specifies the PRBs, and the base station may transmit the data to the UE in the specified PRBs. The UE may thus read the DCI to determine the PRBs carrying data to the UE, and the UE may then read the data from the specified PRBs.

In addition, in the connected mode, the UE may regularly monitor the quality of the base station's coverage and provide the base station with channel-quality reports, to enable the base station to adapt its air interface transmission with the UE. In particular, the UE may regularly establish and report to the base station a channel quality indication (CQI) based on coverage quality (e.g., signal-to-noise ratio) and other channel attributes, and the base station may map the UE's reported CQI to an appropriate modulation and coding scheme (MCS) to be used for air interface communication with the UE, using a predefined CQI-to-MSC mapping table. When the base station has data to communicate to the UE, the base station may then specify the determined MCS in its DCI to the UE and may engage in the transmission accordingly.

The MCS selected by the base station based on the UE's CQI defines a coding rate and a modulation scheme for communicating data from the base station to the UE. In particular, the coding rate defines a rate of usable data communication, taking into account error-correction coding added to help overcome errors in transmission. And the modulation scheme then defines how data will be modulated for transmission on air interface resources to the UE, including how many bits of a coded data stream (sequence of bits) the base station can transmit in each air interface resource, such as with each OFDM symbol. Examples of modulation schemes include (i) Quadrature Phase Shift Keying (QPSK), which represents 2 bits per symbol, (ii) 8PSK, which represents 3 bits per symbol, (iii) 16 Quadrature Amplitude Modulation (16QAM), which represents 4 bits per symbol, and (iv) 64QAM, which represents 6 bits per symbol.

In general, a lower-order MCS, using a lower coding rate (more error-correction data) and/or a modulation scheme in which each air interface resource represents fewer bits, may be more robust and error-tolerant and thus more suitable when the UE's channel conditions are poor. Whereas, a higher-order MCS, using a higher coding rate (less error-correction data) and/or a modulation scheme in which each air interface resource represent a greater number of bits, may be less robust but may provide higher throughput and may thus be more suitable when the UE's channel conditions are good.

OVERVIEW

When a base station is serving a UE, one way to help improve downlink transmission to the UE is to use a coordinated multi-point transmission (CoMP) process, by which the base station and one or more other base stations transmit the same data to the UE concurrently on the same air interface resources, using the same MCS. In particular, when the UE's serving base station schedules data transmission to the UE on particular air interface resources, the serving base station may also provide the data to one or more other base stations and arrange for each other base station to concurrently transmit the same data on the same air interface resources using the same MCS. In this way, although the UE would receive an air resource allocation directive from just its serving base station and may seek to receive the scheduled transmission accordingly, the UE may advantageously receive the transmission coming from both the serving base station and each other base station. This coordinated transmission may thereby add spatial diversity to the transmission, which may help the UE better receive and demodulate the transmission.

Downlink CoMP may be usefully applied in a situation where a UE is in coverage of both its serving base station and at least one other base station. An example of such a situation is where a distant portion of the serving base station's coverage area overlaps with a distant portion of a neighboring base station's coverage area, and where the UE is positioned in the area of overlap. In that situation, the UE would be in relatively poor coverage of its serving base station and relatively poor coverage of the neighboring base station, but applying CoMP with the serving base station and neighboring base station may help to improve service to the UE. Another example of such a situation is where a small cell base station provides coverage within coverage of a macro base station, and where the UE is positioned within coverage of both of those base stations. There, the UE may be in relatively good coverage of either or both base stations, but applying CoMP may still help to improve service to the UE. Other examples are possible as well.

Disclosed herein is a variation of this CoMP process that facilitates service of multiple UEs concurrently by multiple base stations. In accordance with the disclosure, when multiple base stations each serve a respective UE and each base station has a separate, different bit stream to communicate to its respective served UE, bit groups will be defined across the base station's bit streams, such that each bit group includes at least one bit from each base station's bit stream. And the base stations will then engage in CoMP transmission of each bit group, with all of the base stations transmitting the bit group at the same time and frequency as each other, such as on the same resource element, using the same modulation scheme. Each UE may then receive that transmitted bit group and process just the appropriate bit(s) destined to the UE, discarding the others.

By having the base stations transmit a given bit group at the same time and frequency as each other, each of the recipient UEs may benefit from the spatial diversity, which may help improve signal-to-noise ratio of transmission to each UE. In turn, that improved signal-to-noise ratio may enable each base station to use a higher coding rate (i.e., with less error-correction coding) for transmission to its served UE. Further, by having each bit group include at least one bit destined respectively to each of the multiple UEs and by having the base stations transmit the bit group at the same time and frequency as each other, such as on the same resource element, the process provides for more concurrent service of the multiple UEs.

Accordingly, in one respect, disclosed is a method for CoMP transmission concurrently to multiple UEs from multiple base stations, where each base station serves a respective UE and has a separate respective bit stream to wirelessly transmit to the respective served UE, and where each of the UEs is in coverage of all of the base stations. As disclosed, the method involves (i) grouping bits across the base stations' respective bit streams to form bit groups that each include at least one bit from each base station's respective bit stream, and (ii) each of the base stations transmitting each of the bit groups for receipt by each of the UEs, where, for each bit group, all of the base stations transmit the bit group at the same time and frequency as each other, modulating the bit group using the same modulation scheme as each other.

And in another respect, disclosed is a system for CoMP transmission concurrently to multiple UEs from multiple base stations, where each base station serves a respective UE and has a separate respective bit stream to wirelessly transmit to the respective served UE, and where each of the UEs is in coverage of all of the base stations. As disclosed, the system comprises at least one processing unit, at least one data storage, and program instructions stored in the at least one data storage and executable by the at least one processing unit to group bits across the base stations' respective bit streams to form bit groups that each include at least one bit from each base station's respective bit stream. Further, each base station is configured to transmit each of the bit groups for receipt by each of the UEs, where, for each bit group, all of the base stations are configured to transmit the bit group at the same time and frequency as each other.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 3 is a block diagram depicting components of a representative system.

DETAILED DESCRIPTION

As a general matter, the disclosed principles can apply in a scenario where two or more base stations provide overlapping coverage, and where each base station serves at least one UE in the area of coverage overlap. With such an arrangement, the base stations and/or one or more other entities could work to establish bit groups each including at least one of the bits destined to each UE as noted above and to coordinate the base stations' CoMP transmission of each bit group to each of the UEs, allowing each UE to process its respective bit(s) in each bit group.

Figure 1:
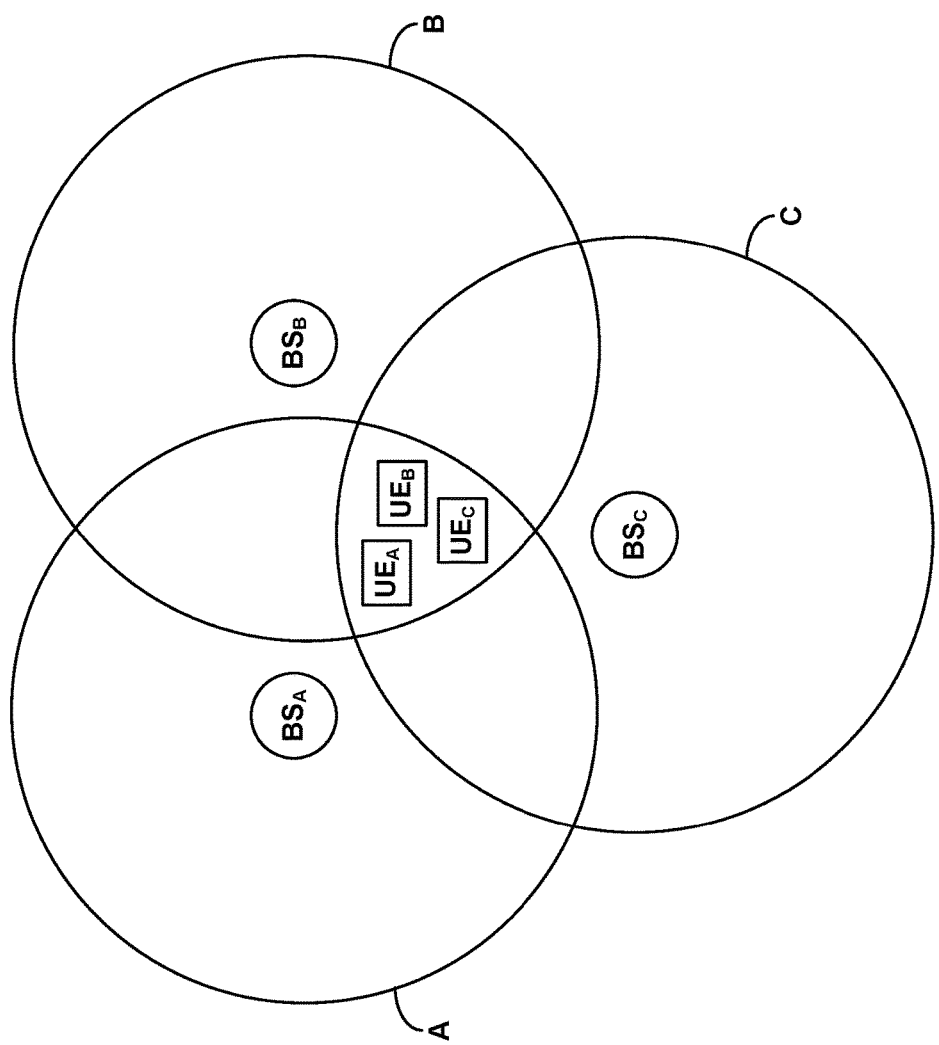
FIG. 1 is a simplified depiction of an example scenario in which multiple base stations each serve a respective UE, with the UEs being in an area of overlap between the base stations' coverage areas.

FIG. 1 is a simplified depiction of such a scenario, where three base stations provide overlapping coverage and where each base station serves a respective UE. In particular, FIG. 1 depicts base stations $BS_A$, $BS_B$, and $BS_C$, providing respective coverage area A, B, and C, and coverage areas A, B, and C are shown overlapping with each other to define an area of overlap. Base station $BS_A$ is then shown serving an example $UE_A$ that is positioned in the area of overlap and can thus receive transmissions from all three base stations, base station $BS_B$ is shown serving an example $UE_B$ that is also positioned in the area of overlap and can thus also receive transmissions from all three base stations, and base station $B_C$ is shown serving an example $UE_C$ that is also positioned in the area of overlap and can thus also receive transmissions from all three base stations.

In this scenario, base stations $BS_A$, $BS_B$, and $BS_C$ provide service on at least the same carrier as each other or otherwise provide service on the same frequency as each other, and the base stations are time synchronized with each other (e.g., according to a common system clock), to facilitate their coordinated transmission. Further, although the figure shows each base station serving just a single UE, in practice each base station may concurrently serve multiple UEs.

In the scenario of FIG. 1, each illustrated UE operates in a connected mode with respect to its serving base station. Thus, $UE_A$ has an established air interface connection, such as an RRC connection, with $BS_A$, and as $BS_A$ receives data to transmit to $UE_A$, $BS_A$ may schedule and provide transmission of the data to $UE_A$ in coverage area A as noted above. Likewise, $UE_B$ has an established air interface connection, such as an RRC connection, with $BS_B$, and as $BS_B$ receives data to transmit to $UE_B$, $BS_B$ may schedule and provide transmission of the data to $UE_B$ in coverage area B as noted above. And $UE_C$ has an established air interface connection, such as an RRC connection, with $BS_C$, and as $BS_C$ receives data to transmit to $UE_C$, $BS_C$ may schedule and provide transmission of the data to $UE_C$ in coverage area C as noted above.

In line with the discussion above, in normal operation, each UE may monitor its serving channel conditions and provide channel quality reports to its serving base station, and its serving base station may then map the reported channel quality to a modulation and coding scheme to use for air interface transmission with the UE. Further, each UE may report to its serving base station the fact that the UE is also within the coverage of the other two base stations, such as by reporting sufficient reference signal strength that the UE detects from each other base station. Thus, each base station may be aware of the UE's presence in each other base station's coverage, and consequently of the possibility of invoking multi-UE CoMP as presently disclosed.

With this arrangement, as noted above, each base station may have a separate respective bit stream (sequence of bits) to transmit to its served UE. For instance, each UE may be engaged in respective unicast communication via the base station with a remote entity such as a network server, and the base station may have buffered some data of that communication to send to the UE. The bit stream that each base station has for transmission to its respective served UE is different than the bit stream that each other base station has for transmission to its respective served UE.

In accordance with the present disclosure, with such an arrangement, a representative implementation may involve multiplexing the bits across the base stations' respective bit streams, defining symbols based on the multiplexed bits, and having all of the base stations send the resulting same symbols as each other at the same time as each other. A UE served by a given such base station could then receive such a symbol and extract just the bit(s) from the bit stream destined to the UE, disregarding the other bits. As noted above, this process may help increase signal-to-noise ratio to each UE, which could thus allow for higher order MCS. Further, the higher order MCS could then help overcome any reduction in throughput that may result from each base station applying this process.

As a simple example of this, consider a scenario where the base stations have the following bit streams (shown here in part) to transmit to their respective served UEs:

Base station $BS_A$ to $UE_A$: 0 1 1 0 0 0 1 1 0
Base station $BS_B$ to $UE_B$: 0 0 1 1 0 1 0 1 0
Base station $BS_C$ to $UE_C$: 1 1 0 0 0 1 0 1 1

From these bit streams, the following bit groups could be established by taking one bit in order respectively from each bit stream:

001 (i.e., the first bit of each stream)
101 (i.e., the second bit of each stream)
110 (i.e., the third bit of each stream)
010 (and so forth)

000
011
100
111
001

Alternatively, each bit group could include a greater number of bits from each or any of the respective bit streams. For instance, each bit group could include 2 bits from each bit stream, or possibly 2 bits from one stream, and one bit from another stream. Other examples are possible as well.

Each base station may then transmit each of these bit groups, with the three base stations using CoMP to transmit each given bit group concurrently on the same air interface resource as each other. For example, for each 3-bit group noted above, each base station may modulate the bit group using 8PSK to generate the same modulation symbol as each other, and all three base stations may transmit the modulation symbol in the same resource element as each other, i.e., at the same time and frequency as each other. Since the three base stations thus concurrently provide the same transmission as each other, each UE may be able to better receive the coordinated transmission.

Each recipient UE may thus receive each transmitted bit group in much the same way as a UE would receive a bit group that carries bits destined to just the UE. But here, each recipient UE would extract from each received bit group just the bit(s) that are from the bit stream destined to the UE, and the UE may discard each other bit of the bit group. To facilitate this, for instance, each UE's serving base station may instruct the UE which bit(s) from each bit group the UE should to read. For instance, the base station may include this instruction in a resource allocation directive such as a DCI that the base station provides to the UE to schedule transmission to the UE. Thus, in the example above, of the three bits represented by each transmitted symbol:

$UE_A$ would extract just the left most bit (and disregard the others)

$UE_B$ would extract just the middle bit (and disregard the others)

$UE_C$ would extract just the right most bit (and disregard the others)

In practice, this multi-UE CoMP process could be coordinated by and among the base stations. Given that the base stations have overlapping coverage, for instance, base station $BS_A$ could be programmed in advance to operate as a master coordinator for the process whenever the process may arise. In practice, then, each base station could learn that its served UE is in coverage of each other base station as well (based on reports from the UE, or in some other manner), and base stations $BS_B$ and $BS_C$ could report to $BS_A$ that that is the case. With possibly additional signaling between the base stations, $BS_B$ and $BS_C$ could then further provide $BS_A$ with copies of the $BS_B$'s and $BS_C$'s respective bit streams. And $BS_A$ could programmatically generate the bit groups and assign each bit group to be transmitted at a particular time and frequency and using a particular modulation scheme such as 8PSK, and $BS_A$ could provide the bit groups and time, frequency, and modulation scheme assignments to $BS_B$ and $BS_C$, to direct CoMP transmission of each bit group.

Each base station may then schedule transmission of each such bit group accordingly to its served UE and may provide the transmission accordingly, thus at the same time and frequency, and using the same modulation scheme, as each other base station. For instance, each base station may transmit to its served UE a resource allocation directive such as a DCI that specifies the assigned time, frequency, and modulation scheme for transmission of the bit group, and each base station may accordingly transmit the bit group at the assigned time and frequency, using the assigned modulation scheme.

In a representative LTE network, as noted above, base stations may allocate resources on a per PRB basis, where each PRB is an array of 84 resource elements each carrying a respective OFDM symbol (although some may be reserved for other use). Given this, a practical implementation of this process may involve coordinating multi-UE CoMP transmission on a per PRB basis. For example, if we assume that there are 80 usable resource elements in each PRB, base station $BS_A$ in the process above could receive from each other base station a sequence of 80 bits from each base station's respective bit stream and could further take a sequence of bits from its own respective bit stream. Base station $BS_A$ could generate a sequence of 80 3-bit bit groups from the three 80-bit sequences, with each bit group including one bit from each of base station's respective 80-bit sequence. Base station $BS_A$ could then assign the 80 bit-groups to the 80 resource elements of a given PRB and could coordinate with base stations $BS_B$ and $BS_C$ to have all three base stations engage in CoMP transmission of that PRB.

This way, all three base stations could thus schedule and engage in transmission of that same PRB (allowing for possible variations if the base stations have different resource elements reserved for reference signal use or the like). Each UE may then respond to its serving base station's resource allocation directive by reading the PRB, which may be a more robust transmission as it would come not only from the UE's serving base station but also from each other base station. And each UE may demodulate the data carried by the PRB and, per instruction from its base station, extract from each 3-bit group just the bit that is destined to the UE, discarding each other bit.

The base stations may carry out this same process for each of a sequence of resource blocks. Thus, possibly on an ongoing basis, for each 80 bits to be transmitted, the base stations may share those bits, and $BS_A$ may generate 3-bit groups and coordinate CoMP transmission of the bit groups on a common PRB for improved receipt by each UE.

Alternatively, the resource allocation for one or more of the UEs at issue could be for just a portion of the PRB rather than for the entire PRB. For example, assuming again that a PRB has 80 usable resource elements, there could be a situation where two base stations have 80 bits to send to their respective UEs but a third base station has just 70 bits to send to its respective UE. In that situation, the base stations could still carry out this process for allocation of a given PRB, but the third base station could direct its served UE to read data from each of the first 70 resource elements of the PRB and not from the remaining 10 resource elements of the PRB. Whereas, the other two base stations could direct their served UEs to each read data from all resource elements of the PRB. To facilitate this in practice, the first two base stations could provide their served UEs with a DCI that allocates the PRB without further qualification (so that those UEs would read data from each resource element of the PRB), but the third base station could provide its served UE with a DCI that allocates the PRB and that further directs the UE to obtain data from just certain specified ones of the resource elements of the PRB rather than from all of the resource elements of the PRB.

In still an alternative implementation, note that this multi-UE CoMP process could be coordinated by one or more other entities. As one example, all three base stations could be configured to more actively participate in the process, such as by all three sharing their bit streams with each other and negotiating with each other to agree on CoMP transmission parameters. As another example, an entity other than the base stations, such as a network server that is part of the supporting network infrastructure noted above or another entity, could be configured to coordinate the process, possibly at the initiation of the base stations upon their learning that the three UEs are all within the coverage overlap area. Such an entity could then receive bit streams that each base station is to transmit to each served UE, and the entity could generate the 3-bit groups as noted above, assign time, frequency, and modulation scheme attributes of the CoMP transmission, and provide the 3-bit groups and CoMP transmission attributes to each base station. And the base stations may engage in CoMP transmission accordingly, including informing their served UEs which bits the UEs are to extract from each bit group.

In addition, in another alternative implementation, note that whichever entity coordinates this could provide each (other) base station with a representation of each 3-bit group rather than with each 3-bit group itself. For example, the entity could itself apply the modulation scheme to generate symbol data such as I and Q symbols representing each 3-bit group, and could provide that symbol data to each (other) base station. Each base station could then use that symbol data as a basis to engage in CoMP transmission of the 3-bit group.

Still further, in another alternative implementation, this process could apply with a different number of base stations. Moreover, a different modulation scheme could be used if other than 3 bits are being grouped together at a time. For example, in a further simplified implementation, just two base stations might provide overlapping coverage, and each base station might serve a respective UE in the coverage overlap. Those two base stations may then work with each other to coordinate multi-UE CoMP service for the two UEs, establishing 2-bit groups cross-wise from the base stations' respective bit streams, and using QPSK to modulate each 2-bit group. And as another example, given a number of base stations with overlapping coverage and applying the process above, the base stations could apply multi-UE CoMP using 16QAM for 4-bit groups or 64QAM for 6-bit groups, still with each bit group including at least one bit from each base station's respective bit stream. Other variations are possible as well.

Note also that, as the multiple base stations involved in this process will likely be different distances from any given one of the UEs, the base stations' time-synchronized transmissions of the same symbols to the UE may arrive at the UE with slightly different delays. As with single-UE CoMP, however, these delays would likely not pose problems, particularly given the narrow 15 kHz band of each symbol transmission, and given the cyclic prefix guard band noted above.

Figure 2:
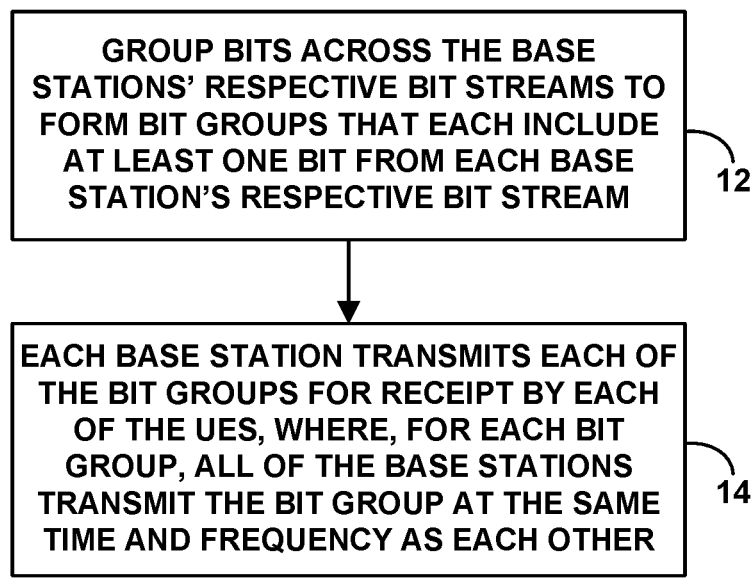
FIG. 2 is a flow chart depicting example operations in accordance with the present disclosure.

FIG. 2 is next a flow chart depicting operations that can be carried out in a method according to present disclosure, to provide CoMP transmission concurrently to multiple UEs from multiple base stations, where each base station serves a respective UE and has a separate respective bit stream to wirelessly transmit to the respective served UE, and where each of the UEs is in coverage of all of the base stations. As noted above, the method could be carried out in response to at least determining that each of the UEs is in coverage of all of the base stations.

As shown in FIG. 2, at block 12, the method includes grouping bits across the base stations' respective bit streams to form bit groups that each include at least one bit from each base station's respective bit stream. And at block 14, the method includes each of the base stations transmitting each of the bit groups for receipt by each of the UEs, where, for each bit group, all of the base stations transmit the bit group at the same time and frequency as each other. Further, in line with the discussion above, for each bit group, all of the base stations optimally modulate the bit group using the same modulation scheme as each other, for air interface transmission.

In line with the discussion above, for instance, the act of all of the base stations transmitting the bit group at the same time and frequency as each other could involve all of the base station transmitting the bit group in a common OFDM resource element. Further, each bit group could include the same number of bits respectively from each base station's respective bit stream, such as two bits including one respectively from each of two base station's respective bit streams (e.g., using QPSK) or three bits including one respectively from each of three base station's respective bit streams (e.g., using 8PSK). Alternatively, each bit group could include a different number of bits respectively from each base station's respective bit stream, such as three bits including two from one base station's respective bit stream and one from another base station's respective bit stream.

Also in line with the discussion above, the base stations may directly or indirectly share their respective bit streams with each other, to enable the base stations to generate and transmit the bit groups. Alternatively or additionally, at least one of the base stations could receive the bit groups from another one of the base stations, to facilitate transmitting of the bit groups by the at least one base station.

And in practice, as also discussed above, the base stations may inform their served UEs which bits from the bit groups the UEs should read, particularly with each base station informing its served UE to read from each bit group the at least one bit from the base station's respective bit stream.

FIG. 3 is next a simplified block diagram of a system for coordinated multipoint transmission concurrently to multiple UEs from multiple base stations, where each base station serves a respective UE and has a separate respective bit stream to wirelessly transmit to the respective served UE, and where each of the UEs is in coverage of all of the base stations. As shown in FIG. 3, the example system includes at least one processing unit 16, at least one data storage 18, and program instructions 20 stored in the at least one data storage and executable by the at least one processing unit to carry out various operations a discussed above. These system components could be provided in conjunction with or as part of one or more of the participating base stations and/or in another entity such as part of the supporting network infrastructure for instance.

The at least one processing unit 16 may comprise one or more general purposes processors (e.g., microprocessors) and/or one or more specialized processors (e.g., application specific integrated circuits, etc.) The at least one data storage 18 may then comprise one or more volatile and/or non-volatile non-transitory storage components, such as magnetic, optical, or flash storage, and could be integrated in whole or in part with the at least one processing unit 16. The program instructions 18 may then be executable to group bits across the base stations' respective bit streams to form bit groups that each include at least one bit from each base station's respective bit stream.

And each base station is then configured (e.g., becomes configured per the program instructions, or by use of separate programmed processor control) to transmit each of the bit groups for receipt by each of the UEs, where, for each bit group, all of the base stations are configured to transmit the bit group at the same time and frequency as each other.

In line with the discussion above, for each bit group, all of the base stations may thus be configured to modulate the bit group using the same modulation scheme as each other, for air interface transmission. Further, all of the base stations may transmit the bit group at the same time and frequency as each other by transmitting the bit group in a common ODFM OFDM resource element. In addition, each bit group could include the same number of bits respectively from each base station's respective bit stream, such as two or three bits as discussed above. Or one or more of the bit groups could include a different number of bits from the participating base station's respective bit streams, such as one bit from one base station and two bits from another base station for instance.

Moreover, as further discussed above, the base stations may be configured to share their respective bit streams with each other. In at least that case, the at least one processing unit, the at least one data storage, and the program instructions could be distributed among the base stations, so that each base station groups the bits across the base stations' respective bit streams to form the bit groups for transmission. Alternatively or additionally, at least one of the base stations could be configured to receive the bit groups from another one of the base stations, to facilitate transmitting of the bit groups by the at least one base station.

And as discussed above, each base station may be configured to inform its respectively served UE which one or more bits from each bit group the UE should read, the one or more bits being one or more bits from the base station's respective bit stream.

Exemplary embodiments have been described above. Those skilled in the art will understand, however, that changes and modifications may be made to these embodiments without departing from the true scope and spirit of the invention.

We claim:

1. A method for coordinated multipoint transmission concurrently to multiple user equipment devices (UEs) from multiple base stations when each base station serves a respective UE and has a separate respective bit stream to wirelessly transmit to the respective served UE and when each of the UEs is in coverage of all of the base stations, the method comprising:
   grouping bits across the base stations' respective bit streams to form bit groups that each include at least one bit from each base station's respective bit stream, wherein the grouping is done by at least one of the base stations or by another entity; and
   each of the base stations transmitting each of the bit groups for receipt by each of the UEs, wherein, for each bit group, all of the base stations transmit the bit group at the same time and frequency as each other.

2. The method of claim 1, wherein, for each bit group, all of the base stations modulate the bit group using the same modulation scheme as each other, for air interface transmission.

3. The method of claim 1, wherein all of the base stations transmitting the bit group at the same time and frequency as each other comprises all of the base station transmitting the bit group in a common orthogonal frequency division multiplex (OFDM) resource element.

4. The method of claim 1, wherein each bit group includes the same number of bits respectively from each base station's respective bit stream.

5. The method of claim 4,
   wherein the multiple base stations is two base stations,
   wherein each bit group is two bits, including one bit respectively from each base stations' respective bit stream, and
   wherein the modulation scheme is QPSK.

6. The method of claim 4,
   wherein the multiple base stations is three base stations,
   wherein each bit group is three bits, including one bit respectively from each base stations' respective bit stream, and
   wherein the modulation scheme is 8PSK.

7. The method of claim 1, further comprising the base stations sharing their respective bit streams with each other to enable the base stations to generate and transmit the bit groups.

8. The method of claim 1, further comprising at least one of the base stations receiving the bit groups from another one of the base stations, to facilitate transmitting of the bit groups by the at least one base station.

9. The method of claim 1, further comprising the base stations informing the UEs which bits from the bit groups the UEs should read,
   whereby each base station informs its served UE to read from each bit group the at least one bit from the base station's respective bit stream.

10. The method of claim 1, carried out in response to at least determining that each of the UEs is in coverage of all of the base stations.

11. In a system comprising multiple base stations, an improvement for coordinated multipoint transmission concurrently to multiple user equipment devices (UEs) from the multiple base stations when each base station serves a respective UE and has a separate respective bit stream to wirelessly transmit to the respective served UE and when each of the UEs is in coverage of all of the base stations, the improvement comprising:
   at least one processing unit;
   at least one data storage; and
   program instructions stored in the at least one data storage and executable by the at least one processing unit to group bits across the base stations' respective bit streams to form bit groups that each include at least one bit from each base station's respective bit stream,
   wherein each of the base stations is configured to transmit each of the bit groups for receipt by each of the UEs,
   wherein, for each bit group, all of the base stations are configured to transmit the bit group at the same time and frequency as each other.

12. The improvement of claim 11, wherein, for each bit group, all of the base stations are configured to modulate the bit group using the same modulation scheme as each other, for air interface transmission.

13. The improvement of claim 11, wherein all of the base stations transmitting the bit group at the same time and frequency as each other comprises all of the base stations transmitting the bit group in a common orthogonal frequency division multiplex (OFDM) resource element.

14. The improvement of claim 11, wherein each bit group includes the same number of bits respectively from each base station's respective bit stream.

15. The improvement of claim 14,
   wherein the multiple base stations is two base stations,
   wherein each bit group is two bits, including one bit respectively from each base stations' respective bit stream, and
   wherein the modulation scheme is QPSK.

16. The improvement of claim 14,
wherein the multiple base stations is three base stations,
wherein each bit group is three bits, including one bit respectively from each base stations' respective bit stream, and
wherein the modulation scheme is 8PSK.

17. The improvement of claim 11, wherein the base stations are configured to share their respective bit streams with each other, and wherein the at least one processing unit, the at least one data storage, and the program instructions are distributed among the base stations, so that each base station groups the bits across the base stations' respective bit streams to form the bit groups for transmission.

18. The improvement of claim 11, wherein at least one of the base stations is configured to receive the bit groups from another one of the base stations, to facilitate transmission of the received bit groups by the at least one base station.

19. The improvement of claim 11, wherein each base station is configured to inform its respectively served UE which one or more bits from each bit group the UE should read, the one or more bits being one or more bits from the base station's respective bit stream.

20. The improvement of claim 11, wherein the at least one processing unit, the at least one data storage, and the program instruction are at a given one of the base stations, whereby the given base station is configured to operate as a master base station for the coordinated multipoint transmission.

\* \* \* \* \*